(12) United States Patent
Simileysky (10) Patent No.: US 11,378,642 B2
(45) Date of Patent: *Jul. 5, 2022

(54) SYSTEMS AND METHODS FOR ESTIMATING ANGLE OF ARRIVAL IN A WIRELESS DEVICE

(71) Applicant: Cypress Semiconductor Corporation, San Jose, CA (US)

(72) Inventor: Victor Simileysky, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,743

(22) Filed: Oct. 9, 2019

(65) Prior Publication Data

US 2020/0057130 A1 Feb. 20, 2020

Related U.S. Application Data

(63) Continuation of application No. 15/632,028, filed on Jun. 23, 2017, now Pat. No. 10,481,236.

(Continued)

(51) Int. Cl.
*G01S 3/48* (2006.01)
*G01S 3/12* (2006.01)
*H04W 4/02* (2018.01)

(52) U.S. Cl.
CPC ............... *G01S 3/48* (2013.01); *G01S 3/12* (2013.01); *H04W 4/023* (2013.01); *H04W 4/026* (2013.01)

(58) Field of Classification Search
CPC ..................................... G01S 3/48; G01S 3/12
See application file for complete search history.

(56) References Cited

U.S. PATENT DOCUMENTS 3,090,957 A * 5/1963 Beisel, Jr. ................. G01S 1/02
342/461
5,973,643 A * 10/1999 Hawkes ................ H04W 64/00
455/456.5

(Continued)

FOREIGN PATENT DOCUMENTS

| EP | 2856200 A1 | 4/2015 |
|----|------------|--------|
| EP | 2992353 A2 | 3/2016 |
| WO | 2018169697 A1 | 9/2018 |

OTHER PUBLICATIONS

International Search Report for International Application No. PCT/US18/20510 dated May 7, 2018; 3 pages.

(Continued)

*Primary Examiner* — Marcus E Windrich

(57) ABSTRACT

An example method of a wireless device includes, determining a first attribute value of a first radio frequency (RF) signal received through a first antenna during a first period, determining a first attribute value of a second RF signal received through the first antenna during a second period, determining a second attribute value of the first RF signal received through a second antenna during the first period, and determining a second attribute value of the second RF signal received through a third antenna during the second period. The method further includes compensating for a determined difference between a first offset introduced by a first oscillator and a second offset introduced by a second oscillator and then estimating an angle of arrival associated with the first and second RF signals, based on attribute values of the first RF signal and the second RF signal.

18 Claims, 9 Drawing Sheets

Related U.S. Application Data (60) Provisional application No. 62/471,821, filed on Mar. 15, 2017.

(56) References Cited

U.S. PATENT DOCUMENTS

| | | | |
|---|---|---|---|
| 6,177,907 B1* | 1/2001 | Golovin | G01S 3/28 342/458 |
| 6,489,923 B1* | 12/2002 | Bevan | H01Q 1/246 342/378 |
| 7,092,673 B2* | 8/2006 | Bevan | H04W 64/00 342/359 |
| 7,162,252 B2 | 1/2007 | Kennedy | |
| 7,847,733 B2* | 12/2010 | Shirakawa | G01S 3/74 342/417 |
| 3,014,791 A1 | 9/2011 | Guigné et al. | |
| 8,014,791 B2* | 9/2011 | Guigne | G01S 5/021 340/5.1 |
| 8,207,892 B2* | 6/2012 | Abbasfar | H04B 7/086 342/414 |
| 8,704,728 B2 | 4/2014 | Mujahed et al. | |
| 9,121,923 B2 | 9/2015 | Bull et al. | |
| 9,274,231 B2 | 3/2016 | Ische et al. | |
| 9,360,546 B2* | 6/2016 | Kim | G10L 17/00 |
| 9,595,996 B2 | 3/2017 | Yun et al. | |
| 9,860,096 B1* | 1/2018 | Ganwani | H04W 4/33 |
| 10,481,236 B2 | 11/2019 | Simileysky | |
| 2010/0302102 A1* | 12/2010 | Desai | G01S 3/50 342/417 |
| 2011/0074633 A1* | 3/2011 | Pun | G01S 3/043 342/442 |
| 2012/0105285 A1* | 5/2012 | Park | G01S 3/48 342/417 |
| 2012/0293235 A1* | 11/2012 | Nakamura | H04H 40/90 327/360 |
| 2014/0070996 A1* | 3/2014 | Kneckt | H04W 64/006 342/417 |
| 2014/0269389 A1* | 9/2014 | Bukkfejes | H04W 24/08 370/252 |
| 2014/0327579 A1* | 11/2014 | Hart | H04W 64/006 342/442 |
| 2016/0327631 A1 | 11/2016 | Salokannel et al. | |
| 2017/0026798 A1 | 1/2017 | Prevatt | |

OTHER PUBLICATIONS

USPTO Advisory Action for U.S. Appl. No. 15/632,028 dated May 8, 2018; 2 pages.

USPTO Final Rejection for U.S. Appl. No. 15/632,028 dated Feb. 20, 2018; 12 pages.

USPTO Final Rejection for U.S. Appl. No. 15/632,028 dated Apr. 23, 2019; 11 pages.

USPTO Non-Final Rejection for U.S. Appl. No. 15/632,028 dated Aug. 31, 2017; 12 pages.

USPTO Non-Final Rejection for U.S. Appl. No. 15/632,028 dated Oct. 17, 2018; 11 pages.

USPTO Notice of Allowance for U.S. Appl. No. 15/632,028 dated Jul. 9, 2019, 7 pages.

Written Opinion of the International Searching Authority for International Application No. PCT/US18/20510 dated May 7, 2018; 7 pages.

\* cited by examiner

SYSTEMS AND METHODS FOR ESTIMATING ANGLE OF ARRIVAL IN A WIRELESS DEVICE

RELATED APPLICATIONS

This application is a continuation of U.S. Non-Provisional patent application Ser. No. 15/632,028, filed Jun. 23, 2017, which claims the priority benefit of U.S. Provisional Application No. 62/471,821, filed Mar. 15, 2017, which are incorporated herein by reference in their entirety.

TECHNICAL FIELD

The subject matter relates to the field of wireless connectivity solutions. More specifically, but not by way of limitation, the subject matter discloses techniques for estimating Angle of Arrival (AoA).

BACKGROUND

AoA typically refers to an angle between a source antenna and a group or array of multiple receiving antennas. Receiving devices can estimate AoA based on a radio frequency (RF) signal emitted by the source antenna. Existing designs and techniques for estimating AoA face various challenges such as backward compatibility issues and demands to reduce cost, footprint, and power consumption.

BRIEF DESCRIPTION OF THE DRAWINGS

Some embodiments are illustrated by way of example and not limitation in the figures of the accompanying drawings in which.

DETAILED DESCRIPTION

Systems and methods for estimating AoA is described. In the following description, for purposes of explanation, numerous examples and embodiments are set forth in order to provide a thorough understanding of the claimed subject matter. It will be evident to one skilled in the art that the claimed subject matter may be practiced in other embodiments. The detailed description discloses examples of estimating AoA based on any incoming pattern of an RF signal with comparable accuracy and reduced power consumption compared to existing arrangements.

Figure 1:
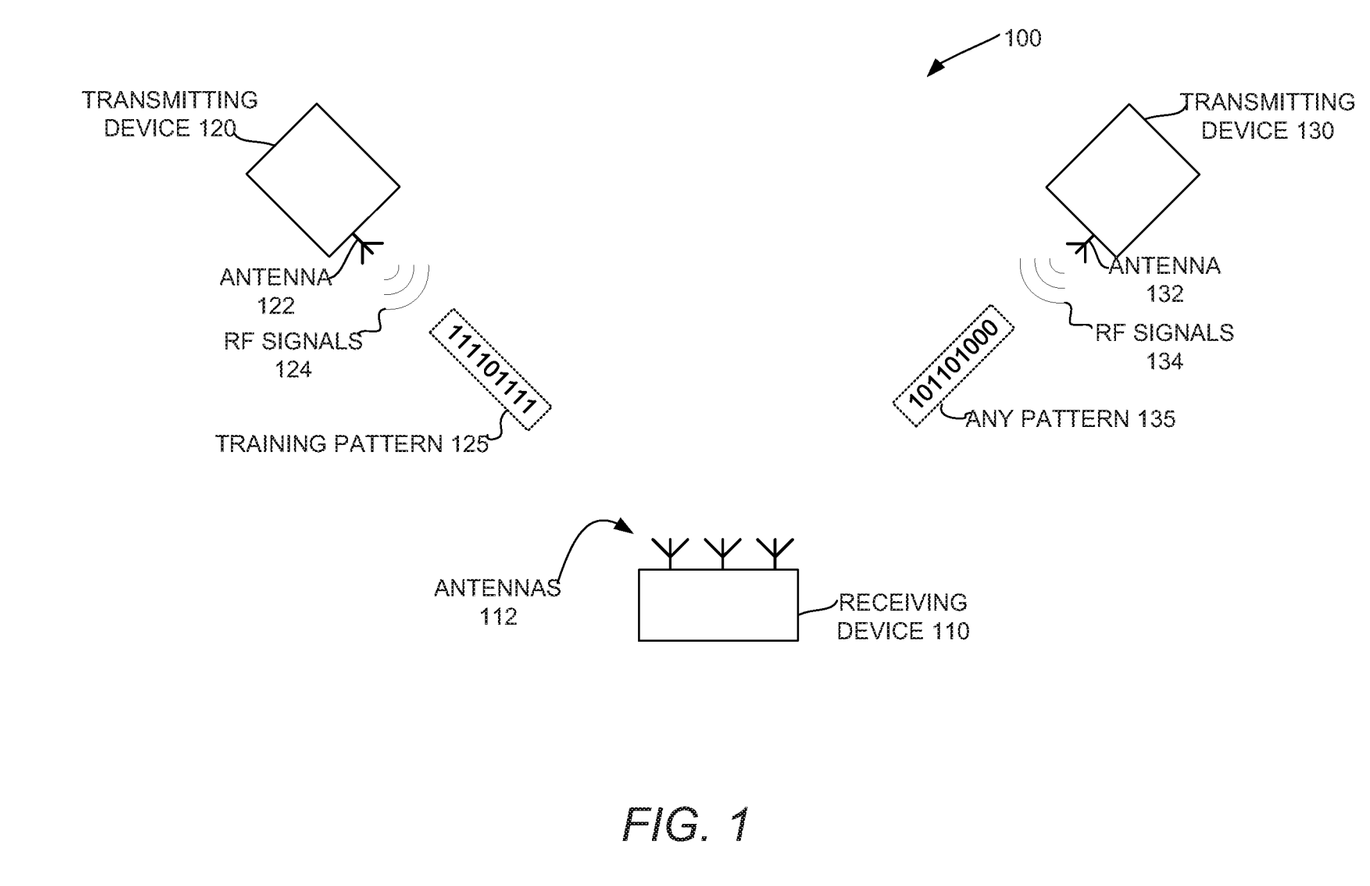
FIG. 1 is a block diagram illustrating a system including a receiving device to estimate relative directions of transmitting devices, in accordance with various embodiments.

Some embodiments are now briefly introduced and then discussed in more detail along with other embodiments beginning with FIG. 1. AoA of an RF signal can be estimated based on attributes or characteristics of the RF signal observed at two different antennas. For example, a wireless device can estimate AoA based on a phase difference of an RF signal concurrently received at two antennas spaced by a known amount. This direction-finding capability can be used in, for example and not limitation, asset/object tracking, gaming, networking, navigation applications, and/or Internet of Things (IoT) applications, including industrial, consumer, and automobile applications.

Some wireless devices with direction finding capability dedicate a different radio transceiver to each of its multiple antennas (e.g., referred to as multi-radio devices). In these multi-radio devices, each antenna is associated with a level of complexity. Not only do the number of transceivers impact the Bill-Of-Materials (BOM) and footprint of the wireless device, but there is a linear relationship between the number of antennas and complexity, which impacts power consumption, among other performance targets. On the other hand, some wireless devices use switching circuitry to couple its single transceiver (e.g., single-radio) to multiple antennas, one at a time, which can result in reduced BOM, footprint, complexity, and overall power consumption (e.g., compared to multi-radio solutions). These systems may have the complexity associated with one antenna, plus a small overhead for the switching control. In single-radio solutions, the RF signals are received through antennas at different times so determining the relevant phase differences (e.g. for AoA estimation) may rely on AoA training patterns (e.g., constant and/or predetermined RF signal modulation) and time-based predictions of phase values to provide reasonably accurate AoA estimations.

Embodiments described herein can accurately estimate AoA without the BOM, footprint, complexity and power consumption issues presented by multi-radio (e.g., dedicated transceiver per antenna) solutions and without a need for constant and/or predetermined incoming patterns or phase prediction used in single radio solutions. Embodiments may have a complexity that is not more than a factor of two greater than single radio solutions. Embodiments that do use any transceivers can have complexity that is less than existing single radio solutions.

In an embodiment, a wireless device and a source of an RF signal are connected within a Wireless Personal Area Network (PAN). For example, the wireless device may be configured to receive Bluetooth and/or ZigBee RF signals having frequencies in the Industrial, Scientific, and Medical (ISM) band. The example wireless device includes a first receive path coupled to a first antenna of an antenna array and a second receive path coupled to a coupling circuit (e.g., a switch). The coupling circuit can alternately couple to a second antenna and a third antenna of the antenna array. In an embodiment, the first receive path includes a phase estimator to provide phase estimations associated with RF signals received through the first antenna and a demodulator to demodulate those RF signals (e.g. for subsequent packet processing). The second receive path includes a phase estimator to provide phase estimations associated with RF signals alternately received through the second antenna and the third antenna. The example wireless device also includes processing circuitry that causes the coupling circuit to couple to the second antenna during a first period and to couple to the third antenna during a second period. The processing circuitry can estimate a direction of a source of the first and second RF signals relative to the antenna array (e.g., AoA of RF signals), based on a first phase difference of the first RF signal between the first antenna and the second antenna and a second phase difference of the second RF signal between the first antenna and the third antenna.

The example wireless device does not rely on constant and/or predetermined incoming patterns and phase predictions (e.g., of single radio solutions) because the first and second receive path can estimate the phases of an RF signal received and observed at two different antennas during the same period. In an embodiment, the wireless device achieves this without the full BOM, footprint, complexity, and power consumption (e.g., of the multi-radio solutions) by sharing among the second and third antenna (e.g., or additional antennas), a partial receive path, which need not include the additional processing required to demodulate RF signals.

As described, the phase difference used to estimate AoA is based on phase values acquired by different receive paths. Thus, a difference in phase offsets experienced by the two receive paths can influence the accuracy of AoA estimations. Some embodiments include a regulator to identify, regulate, and/or initiate compensation for such differences in phase offset. For example, the regulator may regulate one or more local oscillator inputs to down-conversion mixers (e.g. in each of the first receive path and the second receive path) to reduce and/or compensate for an effect of phase offset on the AoA estimation.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating a system 100 including a receiving device 110 to estimate relative directions of transmitting devices 120 and/or 130, in accordance with various embodiments. The transmitting device 120 is shown to transmit through antenna 122 RF signals 124 encoding a training pattern 125 and the transmitting device 130 is shown to transmit through antenna 132 RF signals 134 encoding any pattern 135. The receiving device 110 is coupled to multiple antennas 112 (e.g., three or more) to receive the RF signals 124 and 134. To estimate the relative directions of transmitting devices 120 and/or 130, the receiving device 110 determines the AoA of the RF signals 124 and the RF signals 134, in accordance with embodiments described herein. As will be discussed with respect to FIG. 11, embodiments described herein may be used to enhance numerous direction finding uses cases and applications.

In some embodiments, one or more of the transmitting devices 120 and 130 include circuitry to not only transmit RF signals but also to receive RF signals. Although not shown, either of the transmitting devices 120 and 130 may include multiple antennas for transmit and/or receive operations. Conversely, the receiving device 110 may include circuitry to not only receive RF signals but also to transmit RF signals. In embodiments, any of the devices 110, 120, and 130 may be coupled to another computer device (not shown) through a wired or wireless connection.

Communication protocols supported by one or more of the devices 110, 120, and 130 may include, without limitation, Bluetooth, ZigBee, or Wi-Fi. The devices 110, 120, and 130 may be connected as part of a Wireless Personal Area Network (WPAN), a Wireless Local Area Network (WLAN), or any other wireless network to wirelessly connect computer devices.

In embodiments, the RF signals 124 and 134 (e.g., the carrier waves) may be modulated to encode messages and/or to define patterns, either streamed or packetized, of a communication protocol. In embodiments, the receiving device 110 can estimate the AoA of RF signal 134 based on any pattern 135 where the modulation of the RF signal 134 does not present a constant or predetermined incoming pattern. For example, unlike single-radio systems that rely on incoming patterns corresponding to a known sequence of zeros and ones, such as the training pattern 125, embodiments described herein can estimate AoA using any incoming pattern of any RF signal, whether or not the incoming pattern is known (e.g., by the receiving device 110). Without this ability of the embodiments, devices that do not transmit the training pattern 125 will be difficult if not impractical to track using devices with low complexity comparable to single-radio solutions. An example wave propagation model for estimating AoA is discussed with respect to FIG. 2.

Figure 2:
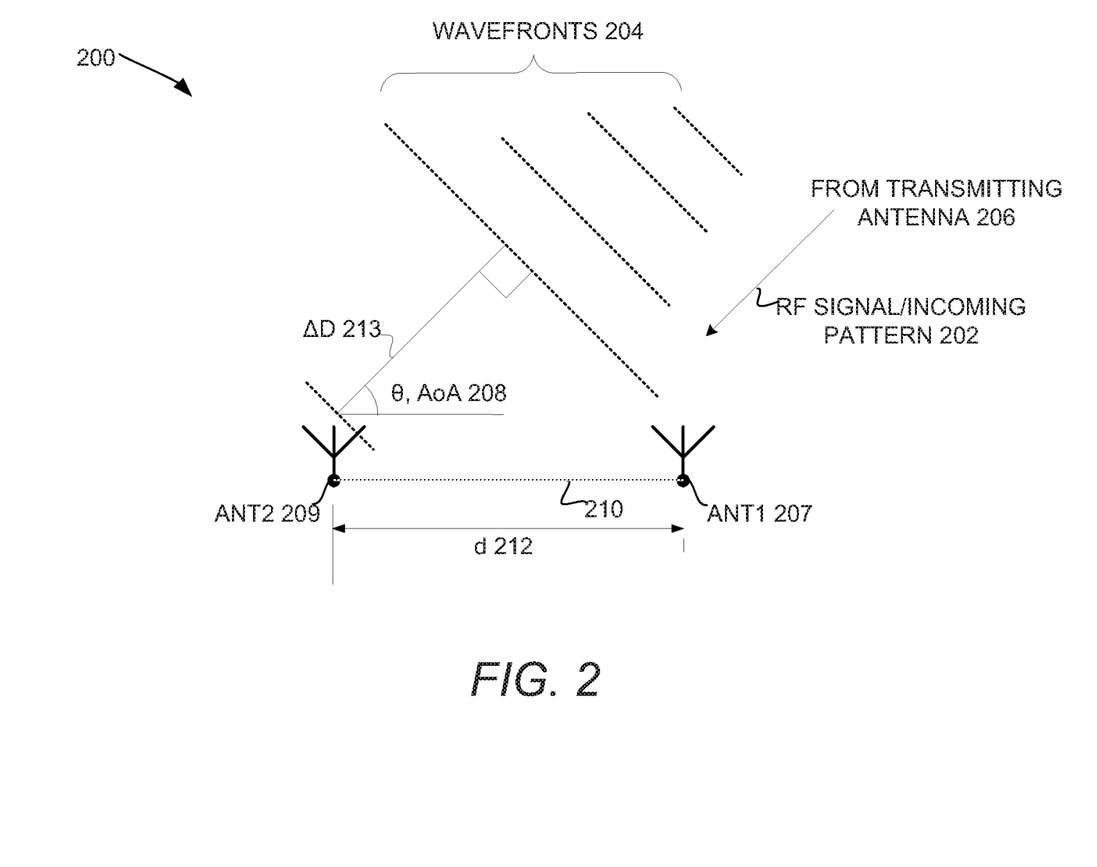
FIG. 2 illustrates a wave propagation model for determining AoA, in accordance with various embodiments.

FIG. 2 illustrates a wave propagation model 200 for determining AoA, in accordance with various embodiments. The RF signal/incoming pattern 202 in FIG. 2 is represented by isoplane wavefronts from a far-field transmitting antenna 206. FIG. 2 shows that the transmitting antenna 206 is at an angle θ, AoA 208 from the axis 210 of the antenna 1 207 and antenna 2 209, which are a distance, d 212 apart. The extra distance that the RF signal travels from antenna 1 207 to reach antenna 2 209 can be expressed as the path difference ΔD 213. By trigonometric identity, θ, AoA 208 is expressed as in the following equation (1):

$$\theta = \cos^{-1}\left(\frac{\Delta D}{d}\right)$$

In some embodiments, ΔD 213 may be estimated by calculating the distance that the RF signal 202 (e.g., a wavefront) traveled (e.g., at the speed of light) between the time it arrived at antenna 1 207 and the time it arrived at antenna 2 209. These times of RF signal 202 arrival and speed of the RF signal 202 are examples of attributes of the RF signal 202 that may be used to estimate the AoA 208. The path difference ΔD 213 may also be expressed through other attributes of the RF signal 202, for example, as the following equation (2):

$$\Delta D = \frac{\lambda}{2\pi}(\varphi_{A2} - \varphi_{A1})$$

where λ is the wavelength of the RF signal 202 and $\varphi_{A1}$ and $\varphi_{A2}$ are phase values of the RF signal 202 antenna 1 207 and antenna 2 209, respectively.

λ can be expressed as in the following equation (3):

$$\lambda = \frac{c}{f}$$

where f is the frequency of the RF signal 202 and c is the speed of light.

Substituting equation (3) into equation (2) above, with all other variables known, AoA 208 can be estimated by determining the phase difference, $\varphi_{A2}$-$\varphi_{A1}$ as illustrated in the following equation (4):

$$\theta = \cos^{-1}\left(\frac{c(\varphi A2 - \varphi A1)}{2\pi f d}\right)$$

In embodiments described herein, estimating the AoA 208 of the RF signal 202 is based on estimating the phases of the RF signal 202 (e.g., an attribute of the RF signal) at multiple antenna elements. Due to the difference in propagation distances from the transmitting antenna 206, the antenna 1 207 and the antenna 2 209 observe a different phase of the RF signal 202. For example, if the wavefronts 204 are assumed to propagate in parallel through space, the phase observed by antenna 1 207 will be $\varphi_{A1}$ (not shown) and the phase observed by antenna 2 209 will be $\varphi_{A2}$ (not shown). In embodiments, the difference between $\varphi_{A1}$ and $\varphi_{A2}$ is the phase difference used to estimate AoA based, at least in part, on equation 4, and/or other relationships involving RF signal attributes that can be used to estimate the AoA 208.

Figure 3:
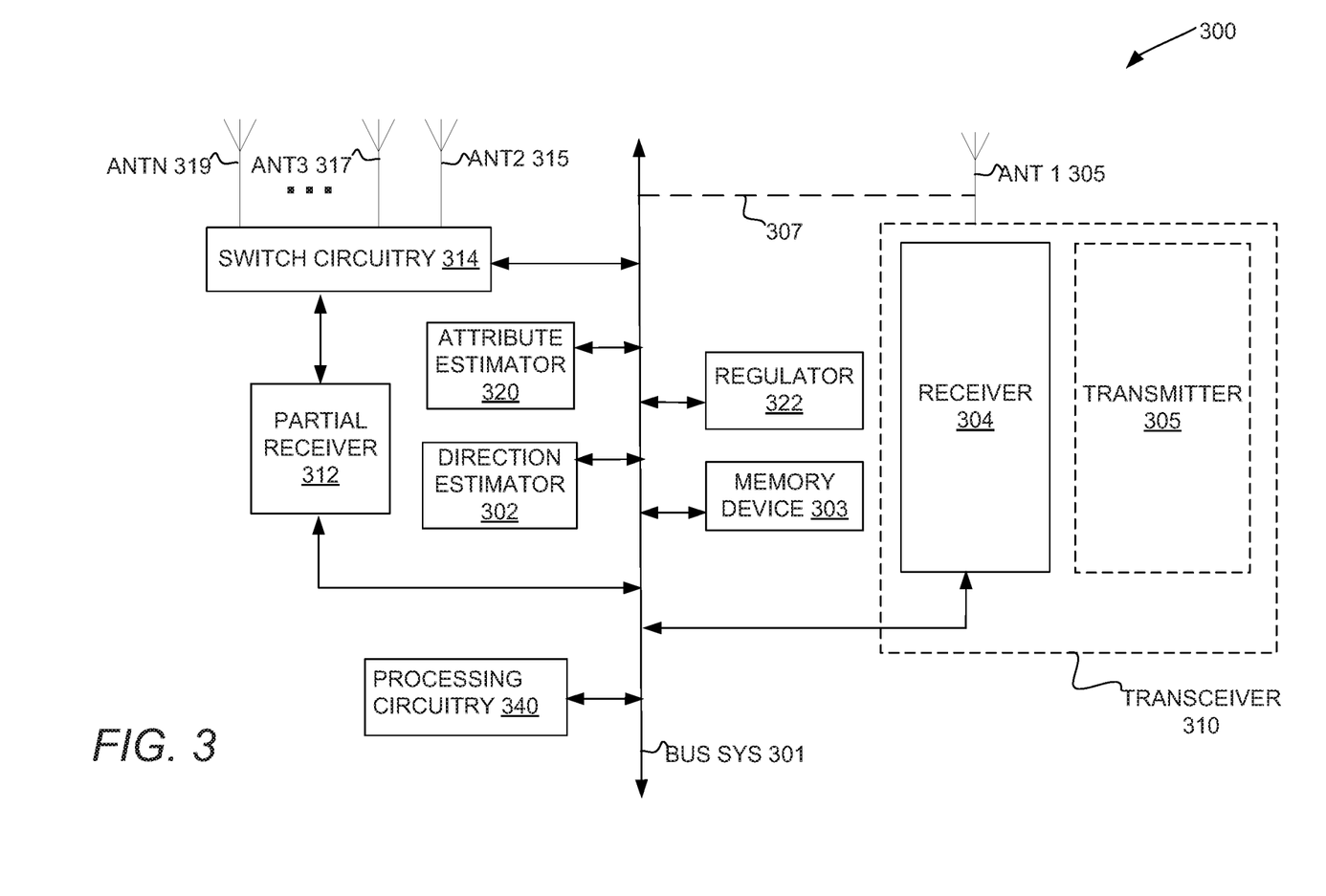
FIG. 3 is a block diagram illustrating a wireless device to estimate AoA based on an RF signal, in accordance with embodiments.

Example structures and methods for estimating AoA without the BOM, footprint, complexity and power consumption issues of some multi-radio (e.g., dedicated transceiver per antenna) solutions, and without the constant and/or predetermined incoming patterns and phase prediction requirements of single radio solutions, are discussed with respect to FIG. 3.

FIG. 3 is a block diagram illustrating a wireless device 300 to estimate AoA based on an RF signal, in accordance with embodiments. In an embodiment, the wireless device 300 may be the receiving device 110 of FIG. 1. The various function blocks in FIG. 3 are shown to be coupled to one another through a bus system 301. The bus system 301 including the connections (e.g., the arrows) between the various blocks may represent one or more media for propagation of analog signals, digital data, control signals, power supply, and/or or any other communication. The bus system 301 may include any appropriate bus configuration without departing from the claimed subject matter.

The direction estimator 302 is to estimate the direction of a source (e.g., a transmitting antenna) of an RF signal relative to multiple receive antennas (e.g., three or more) using one or more attributes of the RF signal. The direction estimator 302 may estimate direction based, at least in part, on equation 4, discussed above with respect to FIG. 2. Accuracy of the AoA estimate can depend on various factors including, without limitation, the number of antennas (e.g., diversity in space), the duration that RF signals are received on each antenna (e.g., number of samples), and signal quality. In embodiments, the samples of the RF signal all correspond to one or more communication protocol packets (e.g., successive packets) and the direction estimator 302 can estimate AoA without establishing a modulation (e.g., Gaussian Frequency-Shift Keying (GFSK)) connection with the source device. In embodiments, the direction estimator 302 may provide or initiate raw data processing to perform noise filtration, data averaging over time, and/or antenna model correlation for the estimation of the final result. Since the direction estimator 302 can estimate AoA based on any incoming pattern, it can locate devices that are not AoA aware (e.g., legacy devices that do no not send a predetermined training signal for AoA estimation) as well as AoA aware devices.

The receiver 304 is to receive RF signals through one or more antennas. Although the receiver 304 is shown in FIG. 3 to be coupled to antenna 1 305, in other embodiments, the receiver may be coupled through switching circuitry (e.g., switching circuitry 314), to any antenna of the wireless device. In an embodiment, the receiver 304 along with the transmitter 305 is part of the transceiver 310. The partial receiver 312 is shown to be coupled to the switch circuitry 314 and is to receive RF signals through one antenna at a time depending on the switch configuration. Although the partial receiver 312 is shown to be coupled to the switch circuitry, the receiver 304 may alternatively or additionally be coupled to the switch circuitry 314. For example, diversity in space can be achieved by coupling the receiver 304 to multiple antennas (e.g., one at a time) through a switch and coupling the partial receiver 312 to a single (e.g., or multiple) antennae. For some embodiments, the partial receiver is part of a transceiver (not shown). In an embodiment, the switch circuitry 314 is a multi-pole switch controlled by the processing circuitry 340 by an input signal. The switch circuitry 314 may be any appropriate coupling circuitry known in the art whose switching and/or selection function may be controlled by any block (e.g., within or external to the wireless device 300) coupled to its input.

In embodiments, the receiver 304 provides additional functionality compared to the partial receiver 312 and consequently may have additional processing requirements and hardware. As will be discussed in more detail with respect to FIGS. 4 and 5, in some embodiments, in addition to estimating phase of RF signals for AoA estimations, the receiver 304 may provide analog and digital signal processing to provide demodulation of RF signals for the wireless device 300. The partial receiver 312 may provide the relatively less analog and digital signal processing used to estimate phase of the RF signals for AoA estimations. The partial receiver 312 may also be referred to as a partial functionality receiver or a partial receiver processing.

Although some embodiments may include more receive processing (e.g., the receiver 304 and the partial receiver 312) than single radio solutions, embodiments can estimate AoA of a source of any RF signal (e.g., any incoming pattern) received at multiple antennas using as little as two partial receivers. Neither the receiver 304 nor the partial receiver 312 need be part of a full transceiver to estimate AoA, but even in embodiments where one or both receivers are a part of full transceivers, those embodiments would still represent lower BOM, footprint, power consumption, and ability to estimate AoA based on any incoming pattern (e.g., protocol independence) compared to conventional multi-radio and single radio solutions.

The attribute estimator 320 is to estimate attributes of RF signals. Attributes of RF signals may include, without limitation, signal frequency, angular frequency, amplitude, phase, wavelength, wave speed, time of arrival, time difference of arrival, phase difference, phase difference of arrival, signal strength, and/or any other RF signal attributes or derivatives thereof. The attribute estimator 320 is to provide estimated attributes to the direction estimator 302 for use in estimating AoA. In some embodiments, the attribute estimator 320 receives attribute information representing or related to RF signal attributes from the receiver 304 and/or the partial receiver 312 and the attribute estimator 320 may estimate RF signal attributes using the attribute information. The attribute estimator 320 may include analog and/or digital logic and/or measurement configurations to obtain RF attributes based on measurements or samples made at one or more locations along the receive path of an RF signal. Although shown as being separate, the attribute estimator 320 may be implemented in whole or in part within the direction estimator 302, the receiver 304, or the partial receiver 312. In an embodiment, the receiver 304 and the partial receiver 312 each include their own attribute estimator (e.g., see phase estimators in FIGS. 4 and 5).

In embodiments, the partial receiver 312 is used to acquire a second reference in space (e.g., the receiver 304 acquires the first reference in space) of AoA estimation, the regulator 322 is to establish that that two the references in space are not unacceptably separated in time (e.g., outside of compensation capabilities).

The regulator 322 is to regulate and/or compensate for conditions of the receiver 304 and the partial receiver 312 so that attributes of the received RF signals can be relied upon for use in AoA estimations. For example, the regulator 322 may determine and/or regulate frequency, phase, or other characteristics of input to or output from the receiver and the partial receiver 312 to control the effect on RF signal attributes used for AoA estimation. In one embodiment, the regulator 322 includes a local oscillator whose signal is coupled to both the receiver 304 and the partial receiver 312 as input to their respective mixers to down-convert incoming RF signals to intermediate frequency signals. By applying the same local oscillator signal to the receiver 304 and the partial receiver 312, the regulator 322 can establish acceptably similar phase offset (e.g., to the RF signal) in the receiver 304 and the partial receiver 312. In an embodiment, the phase offsets are acceptably similar and within a predetermined range of synchronization when the effect of the pattern change (e.g., due to the offset) is within an acceptable estimation error (e.g., assuming that capture time is within a fraction of the symbol duration). As a result, when the attribute estimator 320 provides phase values as RF signal attributes, the phase value of the RF signal received through antenna 1 305 and the phase value of the RF signal received through antenna 2 315 will have the acceptably similar phase offset introduced by the regulator 322.

Alternatively or additionally, the regulator 322 may determine an existing phase offset of the receiver 304 and an existing phase offset of the partial receiver 312 and if the phase offsets are not acceptably similar, perform or initiate a corrective action. For example, the regulator 322 may provide the difference in phase offsets to the direction estimator 302 or the attribute estimator 320 so that the difference can be compensated for in the AoA estimation.

A difference in phase offsets may occur in an embodiment where the receiver 304 and the partial receiver 312 receive their local oscillator signals from different local oscillators. The local oscillator signal for the receiver 304 can have a different frequency or phase from the local oscillator signal of the partial receiver 312—resulting in different phase offsets. The difference in local oscillator frequency may be due to inadvertent lack of synchronization, and/or other tuning differences.

In an embodiment, the regulator 322 or the attribute estimator 320 (e.g., a phase estimator) may monitor and/or sample the signal output from each local oscillator and compare the estimated phase of each signal to determine the difference in phase offset between the receiver 304 and the partial receiver 312. Alternatively or additionally, the regulator 322 may deduce the difference between the phase offsets caused by the two local oscillators. To this end, the regulator 322 may cause antenna 1 305 to be concurrently coupled to the receiver 304 and the partial receiver 312 (e.g., through the conductor 307 and the switch circuitry 314). The attribute estimator 320 may then estimate the phase of the RF signal received through antenna 1 305 and the receiver 304 and the phase of the same RF signal received through antenna 1 305 and the partial receiver 312. Since the RF signal was received during the same period (e.g., at the same time) and through the same antenna, the regulator 322 can deduce that any difference between the estimated phases is the difference between the phase offsets introduced by the local oscillator of the receiver 304 and local oscillator of the partial receiver 312. The regulator 322 may report the difference in phase offsets to the direction estimator 302 so that the difference can be compensated for in the AoA estimation.

In various embodiments, the processing circuitry 340 is to execute at least a portion of one or more of the direction estimator 302, the attribute estimator 320, the regulator 322, or any other function block of the wireless device 300, using corresponding firmware stored in the memory device 303. Alternatively or additionally, any of the function blocks of the wireless device 300 shown in FIG. 3 may include its own processing circuitry (not shown) and/or memory. For example, the direction estimator 302, the attribute estimator 320, the regulator 322, or any other function block of the wireless device 300 may include hardware (circuitry, dedicated logic, etc.), software (such as is run on a general purpose computing system or a dedicated machine), firmware (embedded software), or any combination thereof to perform its functionality.

In an embodiment, the processing circuitry 340, the memory device 303, the receiver 304, the partial receiver 312, and the switch circuitry 314 are part of a System on Chip (SoC) and may reside on a common carrier substrate or be implemented in different combinations of separate integrated circuits. The example SoC may be configured to implement the attribute estimator 320, the direction estimator 302, and/or the regulator 322, in accordance with embodiments.

Figure 4:
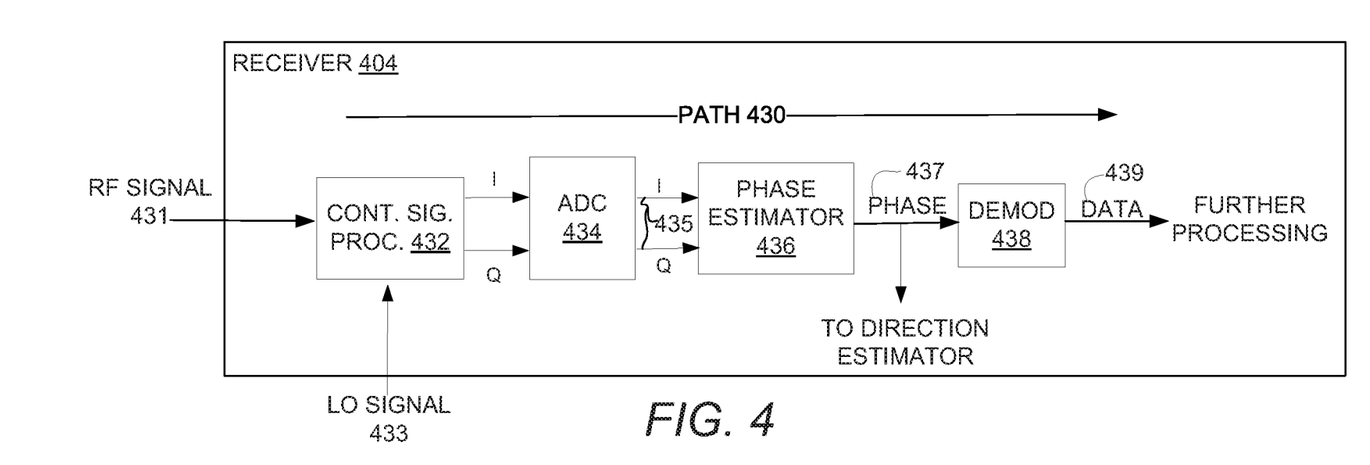
FIG. 4 is a block diagram illustrating a receiver, in accordance with an embodiment.
Figure 5:
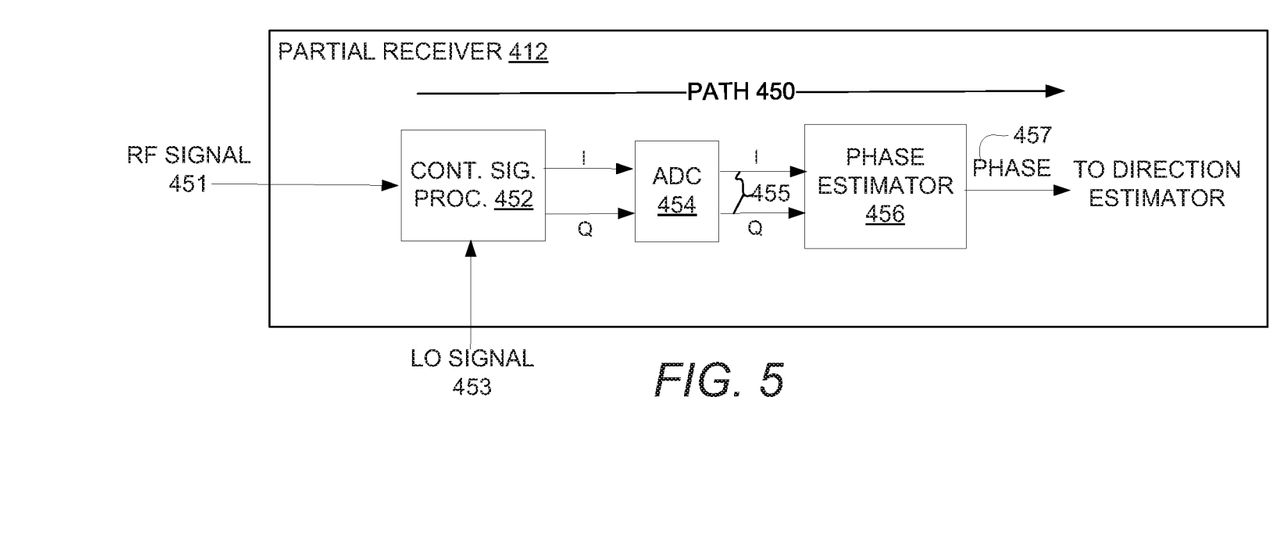
FIG. 5 is a block diagram illustrating a partial receiver, in accordance with an embodiment.

Embodiments of the receiver 304 and the partial receiver 312 are discussed with respect to FIGS. 4 and 5, respectively, and illustrate embodiments where the receiver 304 and the partial receiver 312 each include its own attribute estimator (e.g., a phase estimator) and where the partial receiver 312 has overall less circuitry and functionality that the receiver 304.

FIG. 4 is a block diagram illustrating a receiver 404, in accordance with an embodiment. The receiver 404 of FIG. 4 is an example of the analog and digital signal processing used to provide the demodulation function for a wireless device. The partial receiver 412 of FIG. 5 is an example of the relatively less analog and digital signal processing used to estimate phase of the RF signals 451 for AoA estimations. By providing phase estimation but not demodulation, the partial receiver 412 represents a reduction in BOM, complexity, and power consumption compared to multi-radio AoA solutions.

The receiver 404 is shown to include continuous-time signal processing 432, analog to digital converter (ADC) 434, phase estimator 436, and demodulator 438 all along a receive path 430. In an embodiment, the RF signal 431 enters the continuous-time signal processing 432 where it is filtered and mixed with the local oscillator signal 433 to down-convert the desired frequency (e.g., or channel) to an intermediate frequency. In an embodiment, the down-conversion process provides the intermediate frequency as complex I and Q signals which are sampled and digitized by the ADC 434. The phase estimator 436 may perform calculations to estimate the phase 437 of the RF signal 431 for the time it was received at the antenna using the I and Q values 435, and forward the phase value to the demodulator 438, which forwards the data 439 (e.g., the decoded sequence of 1s and 0s) for further processing (e.g., packet processing). The phase estimator 436 also forwards the phase 437 to the direction estimator 302 of FIG. 3 (e.g., or to a memory) for use in AoA estimation as described herein.

FIG. 5 is a block diagram illustrating a partial receiver 412, in accordance with an embodiment. The partial receiver 412 is shown to include continuous-time signal processing 452, ADC 454, and a phase estimator 456 along the receive path 450. In an embodiment, when the RF signal 451 is received it enters continuous-time signal processing 452 where it is filtered and mixed with the local oscillator signal 453 to down-convert the desired frequency or channel to an intermediate frequency. In an embodiment, the down-conversion process provides the intermediate frequency as complex I and Q signals which are sampled and digitized by the ADC 454. The phase estimator 456 estimates the phase 457 of the RF signal 451 for the time it was received at the antenna using the I and Q values 455 and forwards the phase 457 to the direction estimator 302 for use in AoA estimation.

Figure 6:
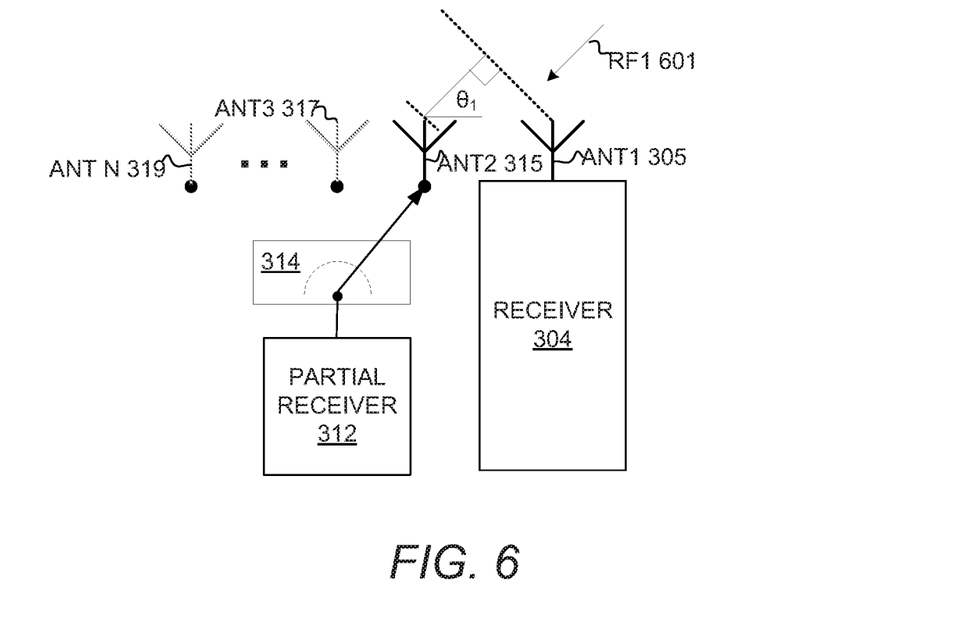
FIG. 6 is block diagram showing a receiver coupled to an antenna and a partial receiver coupled to another antenna through switch circuitry, in accordance with an embodiment.
Figure 7:
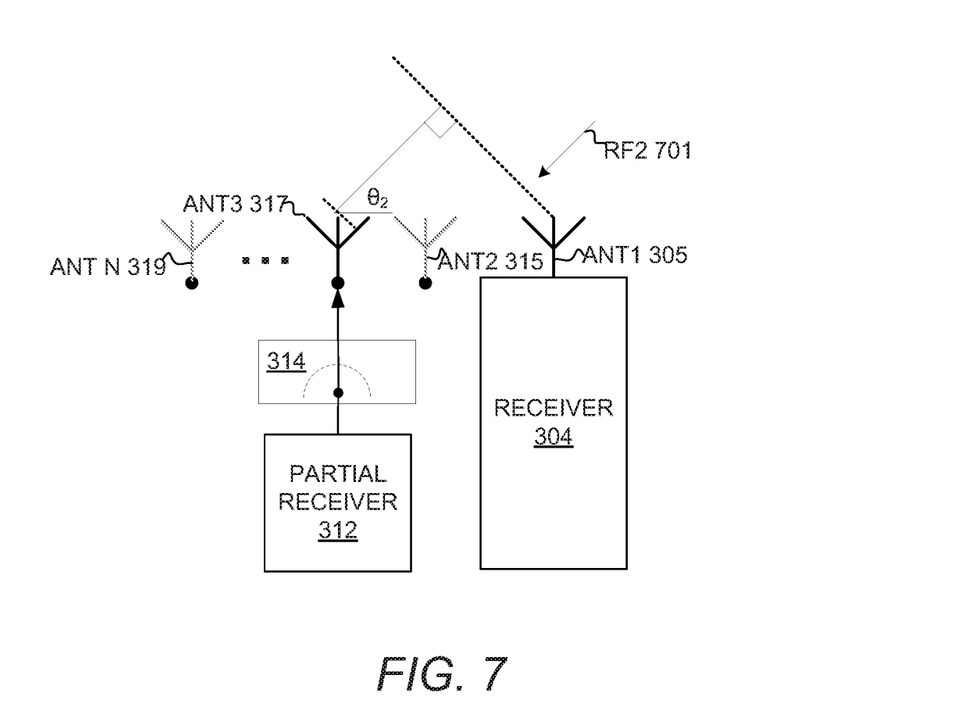
FIG. 7 is a block diagram showing the receiver coupled to the same antenna and the partial receiver coupled to yet another antenna through switch circuitry, in accordance with an embodiment.

FIGS. 6 and 7 are to illustrate switch configurations to couple the partial receiver 312 to different antennas during different periods. In the discussion of FIGS. 6 and 7, the receiver 304, antenna 1 305, partial receiver 312, switch circuitry 314, antenna 2 315, antenna 3 317, and antenna N 319, of FIGS. 6 and 7 may be the same or similar to those described with respect to FIG. 3.

FIG. 6 is a block diagram showing the receiver 304 coupled to antenna 1 305 and the partial receiver 312 coupled to antenna 2 315 through the switch circuitry 314, in accordance with an embodiment. The configuration of the switch circuitry 314 is controllable via control signal (not shown). RF signal RF1 601 is received at antenna 1 301 and antenna 2 315 during the same period. Prior to or during that period, the switch circuitry 314 couples the partial receiver 312 to the antenna 2 315 in time to provide RF1 601 to the partial receiver 312 for phase estimation before the switch circuitry 314 couples the partial receiver 312 to antenna 3 317 (e.g., or another of the antennas 2-N).

Figure 8:
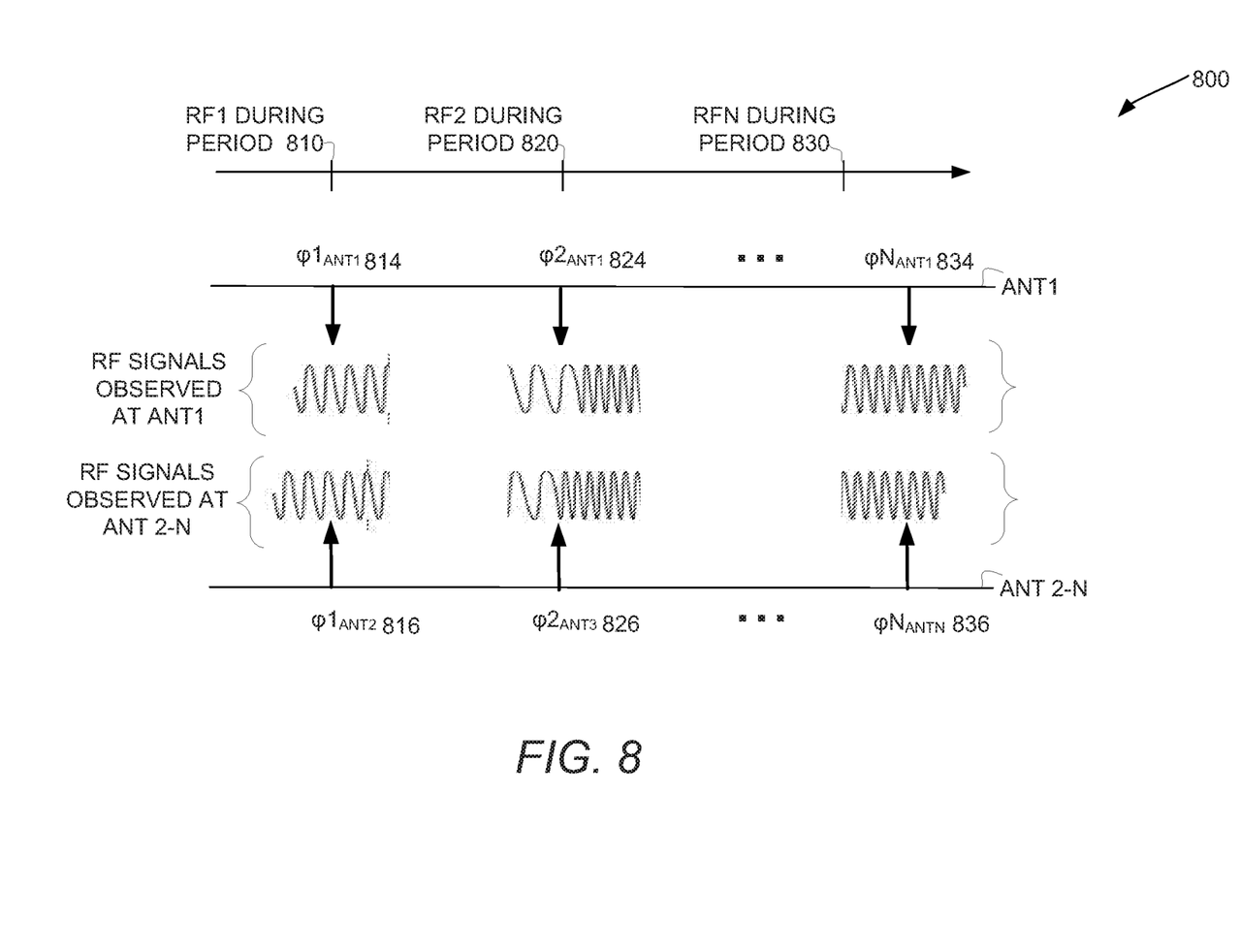
FIG. 8 is a chart diagram illustrating coordination of phase estimations during different periods, in accordance with an embodiment.

FIG. 8 is a chart diagram 800 illustrating coordination of phase estimations during the different periods, in accordance with an embodiment. Referring to FIG. 8, the configuration described with respect to FIG. 6 is discussed where the phase value of RF1 during the period 810, observed on antenna 1 305, is estimated as $\varphi1_{ANT1}$ 814; and the phase value of RF1 during the period 810, observed on antenna 2 315, is estimated as $\varphi1_{ANT2}$ 816. As can be seen in FIG. 8, different portions of RF1 are observed at antenna 1 305 and antenna 2 315 during period 810, resulting in different estimated phases. Although FIG. 8 depicts the frequency modulated RF signals reaching antenna 1 305 first, in some embodiments the RF signals may reach other antennas first and/or be modulated with respect to phase or otherwise, without departing from the claimed subject matter.

FIG. 7 is a block diagram showing the receiver 304 coupled to the antenna 1 305 and the partial receiver 312 coupled to the antenna 3 317 through the switch circuitry 314, in accordance with an embodiment. In embodiments, switch circuitry 314 is controlled by the partial receiver 312. RF signal RF2 701 is received at antenna 1 305 and antenna 3 317 during the same period. Prior to or during that period, the switch circuitry 314 couples the partial receiver 312 to the antenna 3 317 in time to provide RF2 701 to the partial receiver 312 for phase estimation before the switch circuitry 314 couples the partial receiver 312 to another of the antennas 2-N to receive a subsequent RF signal.

Referring again to FIG. 8, the configuration described with respect to FIG. 7 is discussed where the phase value of RF2 during period 820, observed on antenna 1 305, is estimated as $\varphi2_{ANT1}$ 824; and the phase value of RF2 during period 820, observed on antenna 3 317, is estimated as $\varphi2_{ANT3}$ 826. The switching circuitry 314 may proceed to couple the partial receiver 312 to antenna N 319 by way of any intervening antennas, where the phase value of RFN during period 830, observed on antenna 1 305, is estimated as $\varphi N_{ANT1}$ 834; and the phase value of RFN during period 830, observed on antenna N 319, is estimated as $\varphi N_{ANTN}$ 836. FIG. 8 illustrates that the embodiments described herein provide phase estimations (e.g., or other RF signal attributes) for RF signals received at antennas during a same period, where the antennas are diverse in space to allow for AoA estimation based on any incoming pattern using less receiver circuitry than multi-radio solutions.

The switching between the antennas can be timed and/or ordered such that an adequate number of phase values are obtained within the duration of one or more successive packets, such that resulting AoA estimations fall within a targeted range of accuracy. The switching between antennas 2-N may be timed and/or ordered so that phase values of RF signals corresponding to certain portions of packets (e.g., certain fields) can be estimated. In addition, switch timing may be optimized to meet performance targets (e.g., power consumption, accuracy, speed) based on based on the frequency, wavelength, receive strength, incoming pattern, or any other attributes of the RF signal.

Figure 9:
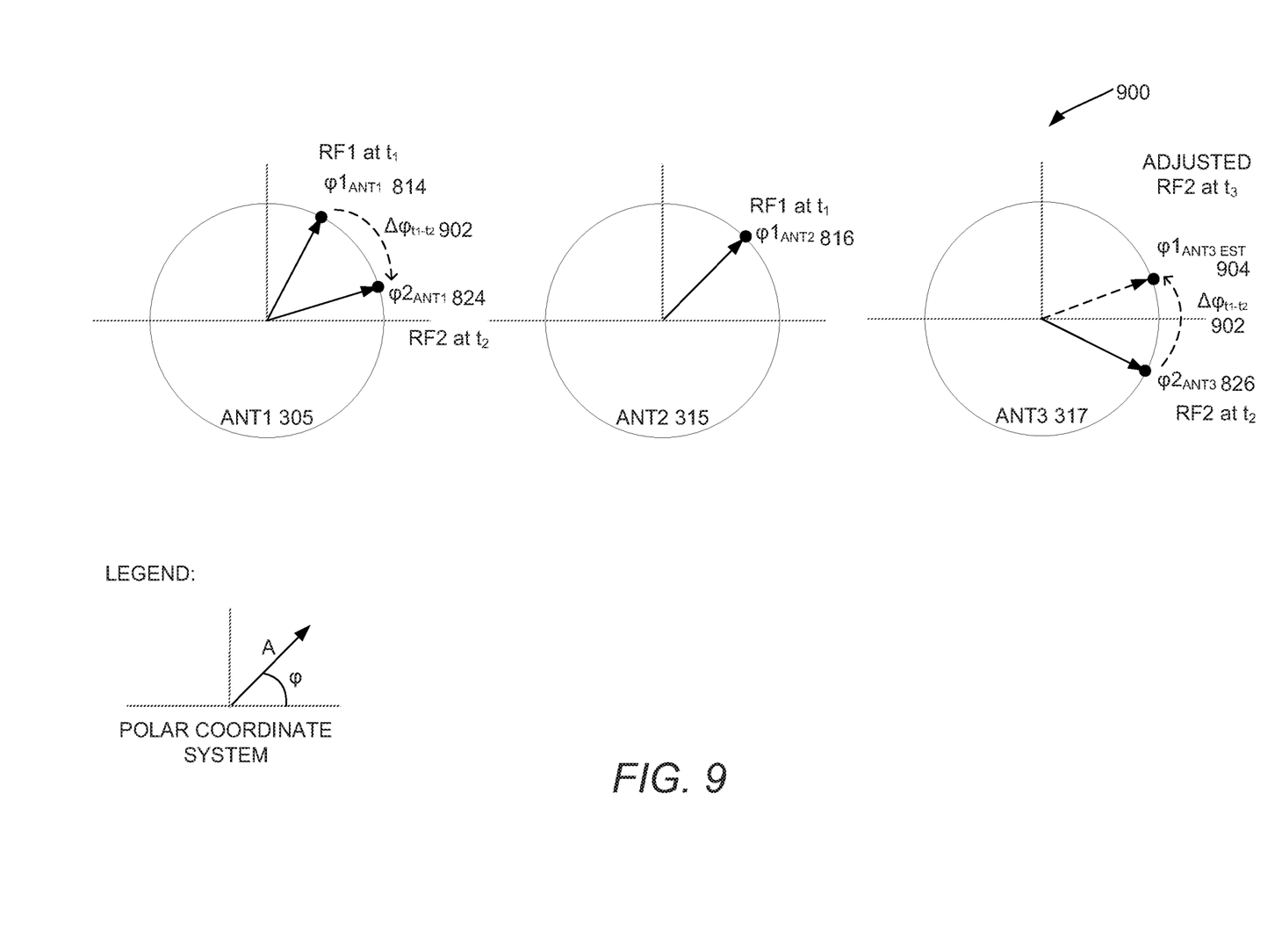
FIG. 9 is a graph diagram illustrating a phase differences used to provide an adjusted or estimated phase value, in accordance with an embodiment.

Accuracy of AoA estimation can typically improve by combining a number of independent attribute estimations for a particular RF signal or packet. In embodiments, multiple antennas (e.g., 8-10) are used in various configurations to obtain multiple phase values, which can be input to estimating algorithms such as MUltiple SIgnal Classification (MUSIC), Estimation of Signal Parameters via Rotational Invariance (ESPRIT), Generalized Cross Correlation (GCC), and the like, for AoA estimations. To estimate AoA, embodiments can provide a number of phase values equal to the number of antennas. The RF signals used to estimate these phase values however are observed on antennas during different periods. Some estimating algorithms are designed to take as input, phase values corresponding to RF signals observed on array of antennas approximately at the same time. FIG. 9 describes embodiments for adjusting and/or estimating phase values to provide the set of adjusted or estimated phase values as input to an estimating algorithm.

FIG. 9 is a graph diagram 900 illustrating a phase difference used to provide an adjusted or estimated phase value, in accordance with an embodiment. FIG. 9 shows the phase values of FIG. 8 for RF1 during period 810 and RF2 during period 820, as observed on antenna 1 305, antenna 2 315, and antenna 3 317. For example, at $t_1$, RF1 observed on antenna 1 305 has the phase value $\varphi 1_{ANT1}$ 814 and RF1 observed on antenna 2 315 has the phase value $\varphi 1_{ANT2}$ 816. At $t_2$, RF2 observed on antenna 1 305 has the phase value $\varphi 2_{ANT1}$ 824 and RF2 observed on antenna 3 317 has the phase value $\varphi 2_{ANT3}$ 826. At this point the phase values corresponding to antenna 1 305 and antenna 2 315 at t1 have been obtained for t1 but no phase value has been obtained that corresponds to antenna 3 317 at t1. The phase difference between the phase values at antenna 1 305 is shown as $\Delta \varphi t_{1-t2}$ 902. This difference represents the signal progression between t1 and t2. If it is assumed that whatever progression and corresponding phase difference observed on antenna 1 305 between t1 and t2 would have also been observed on antenna 3 317, then subtracting the phase difference $\Delta \varphi t_{1-t2}$ 902 from the phase value $\varphi 2_{ANT3}$ 826 on the antenna 3 at t2 will result in an estimated phase value $\varphi 1_{ANT3\_EST}$ 904 that would have existed at antenna 3 317 if RF1 were observed at antenna 3 317 at t1. In an embodiment, the direction estimator 302 of FIG. 3 provides the adjustments and/or estimations described with respect to FIG. 9. This same technique can be used to provide adjusted phase values for any of the remaining N antennas. In this fashion, a set of adjusted and/or estimated phase values corresponding to a specific capture period can be provided as input to various estimation algorithms.

Figure 10:
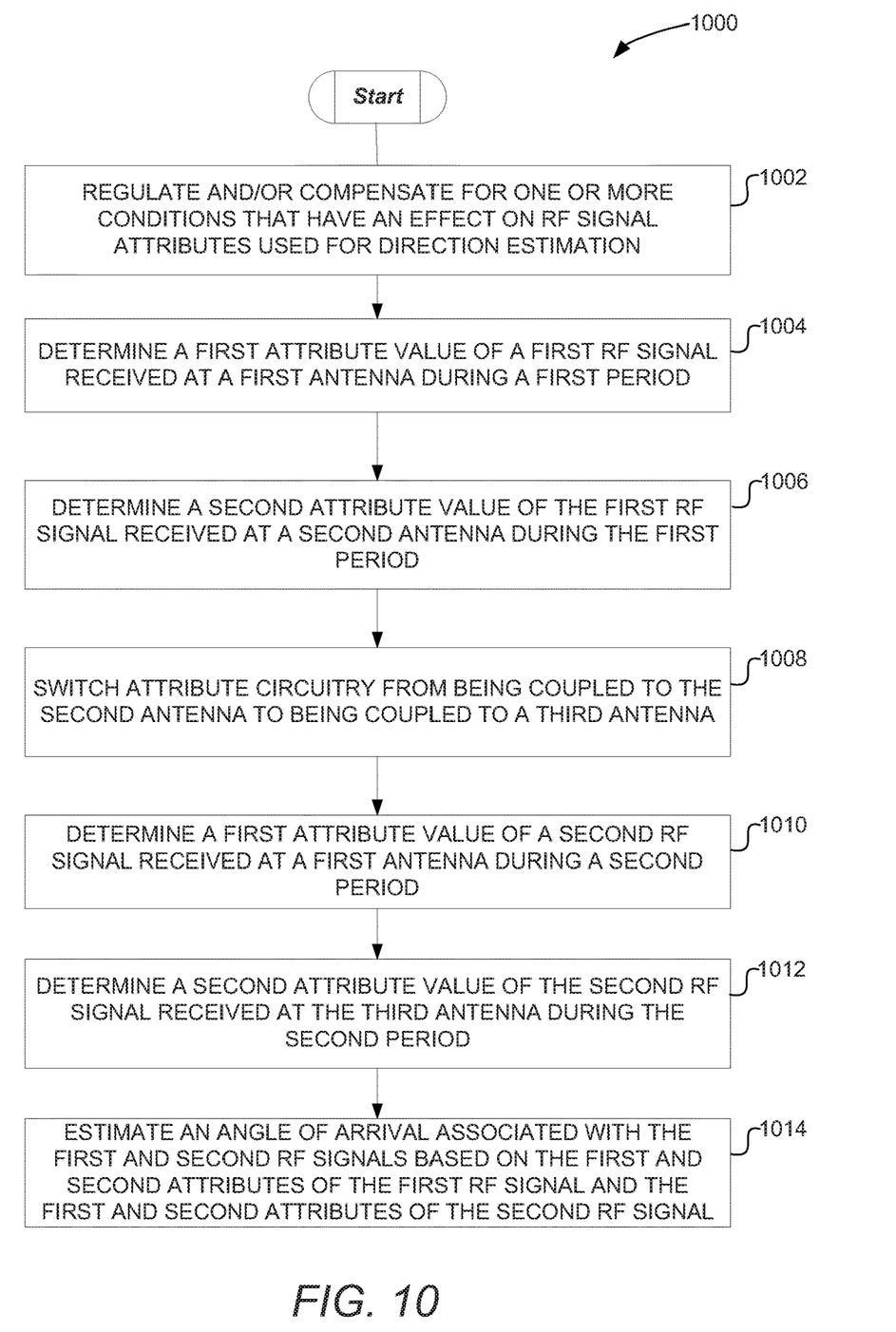
FIG. 10 is a flow diagram illustrating a method of estimating AoA, in accordance with an embodiment.

FIG. 10 is a flow diagram illustrating a method 1000 of estimating AoA, in accordance with an embodiment. The method 1000 can be performed by processing logic comprising hardware (circuitry, dedicated logic, etc.), software (such as is run on a general purpose computing system or a dedicated machine), firmware (embedded software), or any combination thereof. In various embodiment, the method 1000 can performed by the wireless device of FIG. 3 for example, as further described with respect to FIGS. 4-8 and 10.

For example, at block 1002 the regulator 322 of FIG. 3 regulates and/or compensates for one or more conditions that have an effect on RF signal attributes used for direction estimation. In some embodiments, the regulator 322 synchronizes to within a threshold range of synchronization a phase offset of the transceiver 310 (e.g., the receiver) with a phase offset of the partial receiver 312. Referring to the examples of FIGS. 4 and 5 the regulator 322 can regulate or synchronize the local oscillator signal 433 and 453 input to the first down-conversion mixer and the second down-conversion mixer to reduce an effect of phase offset on the estimate of the direction. Alternatively or additionally, the regulator 322 may determine a phase difference between the phase offset of the transceiver 310 and the phase offset of the partial receiver 312 (e.g., as described with respect to FIG. 3) to aid in compensating for the difference in AoA estimations.

At block 1004, the attribute estimator 320 of FIG. 3 determines a first attribute value of a first RF signal received at antenna 1 305 (e.g., a first antenna) during a first period. In an embodiment, the receiver 304 within the transceiver 310 of FIG. 3 includes the phase estimator 436 of FIG. 4 as an attribute estimator to provide the first phase value (e.g., 814) of the first RF signal received through a first antenna during a first period (e.g., 810) as illustrated in FIG. 8.

At block 1006, the attribute estimator 320 of FIG. 3 determines a second attribute value of the first RF signal received at a second antenna during the first period. For example, the receiver 312 of FIG. 3 may include the phase estimator 456 of FIG. 5 as its attribute estimator, and when coupled to antenna 2 315 through the switch circuitry 314 as shown in FIG. 6, the partial receiver 312 can provide a second phase value (e.g., 816) of the first RF signal received through the second antenna during the first period (e.g., 810) as illustrated in FIG. 8.

At block 1008, the switching circuitry 314 switches the attribute estimator (e.g., of the partial receiver 312) from being coupled to the second antenna to being coupled to a third antenna. For example, FIG. 7 shows the partial receiver 312 having been switched by the switching circuitry 314 from antenna 2 315 to antenna 3 317. The switching circuitry 314 is controllable by an input signal and may couple the partial receiver 312 to any of the 2-N antennas.

At block 1010, the attribute estimator 320 of FIG. 3 determines a first attribute value of a second RF signal received at a first antenna during a second period. Referring again to FIG. 4 the receiver 304 within the transceiver 310 of FIG. 3 includes the phase estimator 436 of FIG. 4 as the attribute estimator to provide the first phase value (e.g., 824) of the second RF signal received through the first antenna during the second period (e.g., 820) as illustrated in FIG. 8.

At block 1012 the attribute estimator 320 of FIG. 3 determines a second attribute value of the second RF signal received at the third antenna during the second period. For example, the partial receiver 312 of FIG. 3 may include the phase estimator 456 of FIG. 5 as its attribute estimator, and when coupled to antenna 3 317 through the switch circuitry 314 as shown in FIG. 7, the partial receiver 312 can provide a second phase value (e.g., 826) of the second RF signal received through the third antenna during the second period (e.g., 820) as illustrated in FIG. 8.

At block 1014, the direction estimator 302 of FIG. 3 estimates an angle of arrival associated with the first and second RF signals based on the first and second attributes of the first RF signal and the first and second attributes of the second RF signal. In some embodiments, the direction estimator 302 is implemented using the processing circuitry and estimates a direction of a source of the first and second RF signals relative to the antenna array, based on a first phase difference of the first RF signal between the first antenna and the second antenna and a second phase difference of the second RF signal between the first antenna and the third antenna.

In embodiments that estimate AoA using estimation algorithms, the direction estimator 302, may further determine a phase difference between the first phase value of the first RF signal observed on the first antenna and the first phase value of the second RF signal observed on the first antenna, as illustrated and described with respect to FIG. 9. The direction estimator 302 may then subtract this phase difference from the second phase value of the second RF signal observed on the third antenna to estimate a third phase value of the first RF signal received through the third antenna during the first period, as illustrated and described with respect to FIG. 9. In an embodiment, the direction estimator 302 uses the phase values observed during the first period on antenna 1 305 and antenna 2 315 along with the estimated third phase value for antenna 3 317 during the first period in the estimation algorithm to estimate the angle of arrival.

In some embodiments, each RF signal may have a frequency within the ISM band and encode at least a portion of a Bluetooth packet, ZigBee packet, or Wi-Fi packet. For example, and not limitation, signals may be employed having characteristics that are compliant with Bluetooth low energy (BLE), Bluetooth basic range/enhanced data rate (BR/EDR), or Institute of Electrical and Electronics Engineers (IEEE) 802.11 and 802.15.4. A person having ordinary skill will understand that other embodiments may provide direction estimation for RF signals of any wireless communication spectra, modes of modulation, and/or communication protocols without departing from the inventive subject matter.

As discussed above some AoA estimation solutions dedicate a different radio transceiver to each of its multiple antennas (e.g., multi-radio devices). For these devices, not only do the number of transceivers impact the BOM and footprint of the wireless device, but there is a linear relationship between the number of antennas and system complexity, which impacts power consumption. Other AoA estimation solutions use switching circuitry to couple a single transceiver (e.g., single-radio) to multiple antennas, one at a time, which compared to multi-radio solutions, can result in reduced BOM, footprint, complexity, and overall power consumption. In single-radio solutions, the RF signals are received through antennas at different times so determining the relevant phase differences (e.g. for AoA estimation) may rely on constant and/or predetermined RF signal modulation (e.g., incoming patterns) and time-based predictions of phase values to provide acceptable AoA estimations. Embodiments described herein can accurately estimate AoA without the BOM, footprint, complexity and power consumption issues presented by multi-radio (e.g., dedicated transceiver per antenna) solutions and without a need for constant and/or predetermined incoming patterns or phase prediction used in of single radio solutions. Some non-limiting applications for AoA-based location finding using any RF signal are discussed with respect to FIG. 11.

Figure 11:
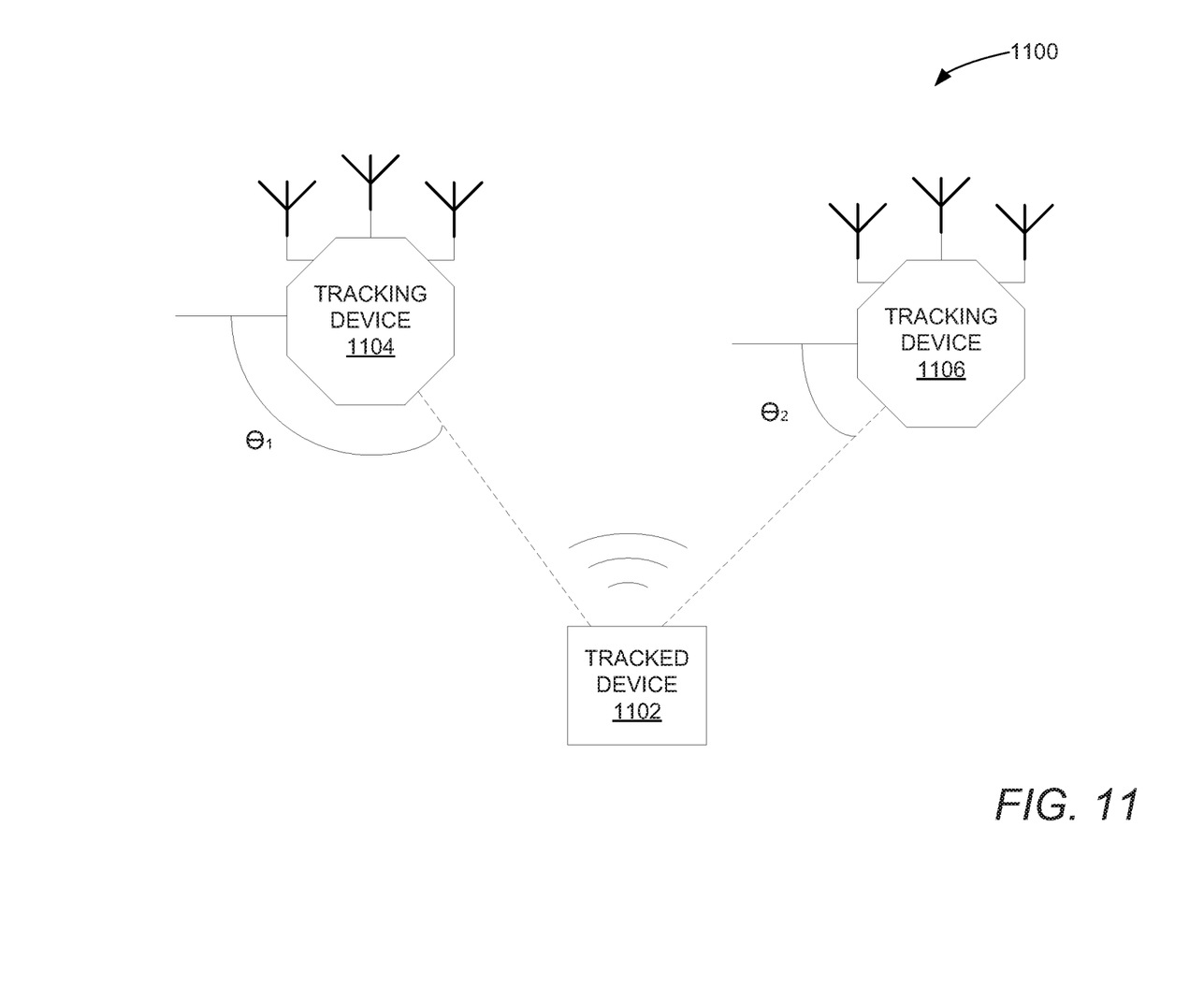
FIG. 11 is a block diagram illustrating an AoA estimation configuration applicable to various applications, in accordance with various embodiments.

FIG. 11 is a block diagram illustrating an AoA estimation configuration 1100 applicable to various applications, in accordance with embodiments. In embodiments, the tracked device 1102 includes at least one antenna (not shown) to transmit RF signals and the tracking devices 1104 and 1106 each include at least three antennas and use the systems and methods described herein to estimate an AoA of the tracked device 1102. AoA estimations from the multiple tracking devices 1104 and 1106 and/or other information such as distance ranging or topology knowledge can be used (e.g., by any network node) to estimate two or three-dimensional location of the tracked device 1102. This capability may be used for, without limitation, warehouse/retail inventory tracking indoor location/navigational services, network efficiency, and home automation devices with location assistance.

For example, some smart lighting systems utilize ZigBee PAN protocol between its hub and the lightbulbs. The set-up process may include assignment of each bulb ID with specific location (e.g., the hall, the bedroom, etc.). While currently this process is manual, with location tracking enabled, it can be semi-fully automated. Embodiments may be implemented in control hub device(s) (e.g., the tracking devices 1104 and 1106) to identify the direction to each lightbulb (e.g., the tracked device 1102). In embodiments, coordinate location of the lightbulbs can be achieved through techniques known by those having ordinary skill in the art such as distance finding, trilateration, indoor mapping information, and triangulation using multiple tracking devices.

Since the embodiments described herein can estimate AoA based on any incoming pattern (e.g., protocol and pattern independent), the functionality can be enabled in tracking devices (e.g., tracking devices 1104 and 1106) so that both AoA aware devices (e.g. those that provide a predetermined pattern to the tracker for AoA estimation) and AoA unaware devices in the PAN network can be located. The AoA-based tracking devices 1104 and 1106 will work with the existing PAN installment base (e.g., AoA unaware legacy devices) while maintaining low complexity (e.g., some embodiments only add a partial receiver and a switch) of the PAN solutions. One having ordinary skill in the art would recognize that some embodiments described herein may be used in network devices not explicitly designated as PAN devices Embodiments for tracking of AoA unaware devices can be applied to mesh network management. When embodiments are used to gain a knowledge of physical topology of the mesh elements—management, diagnostic, and use applications can be extended or developed involving AoA unaware devices. For example, directional transmission can be used for congestion reduction. Once AoA of a tracked device 1102 is established, a tracking device (e.g., 1104) with an ability to direct its or the tracked device's signals, can cause itself or the tracked device to limit the range of signal broadcast to reduce interference to the neighboring networks. This may be implemented using known beamforming techniques or through the use of directional antennas.

The above description is intended to be illustrative, and not restrictive. For example, the above-described embodiments (or one or more aspects thereof) may be used in combination with each other. Other embodiments will be apparent to those of skill in the art upon reviewing the above description. In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense. The scope of the claims should be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:
1. A method of a wireless device, the method comprising:
based on a first signal from a first oscillator of the wireless device, determining a first phase value of a first radio frequency (RF) signal received through a first antenna during a first period, and determining a first phase value of a second RF signal received through the first antenna during a second period;

based on a second signal from a second oscillator of the wireless device, determining a second phase value of the first RF signal received through a second antenna during the first period, and determining a second phase value of the second RF signal received through a third antenna during the second period; and determining a difference between a first offset introduced by the first oscillator and a second offset introduced by the second oscillator;

compensating for the determined difference; and estimating an angle of arrival associated with the first and second RF signals, based on the first and second phase values of the first RF signal, and the first and second phase values of the second RF signal.

2. The method of claim 1, wherein the estimating of the angle of arrival comprises determining a first phase difference and a second phase difference, wherein the first phase difference is between the first and second phase values of the first RF signal and the second phase difference is between the first and second phase values of the second RF signal.

3. The method of claim 1 wherein the estimating of the angle of arrival comprises adjusting the second phase value of the second RF signal to estimate a third phase value of the first RF signal received through the third antenna during the first period, said adjusting comprising determining a phase difference between the first phase value of the first RF signal and the first phase value of the second RF signal, and subtracting the phase difference from the second phase value of the second RF signal.

4. The method of claim 1 comprising using a first receiver coupled to the first antenna, processing the first RF signal and the second RF signal received through the first antenna, and using a second receiver configured to be coupled to the second and third antenna through a switching circuit, processing the first RF signal received through the second antenna and the second RF signal received through the second antenna.

5. The method of claim 1, wherein the compensating for the determined difference is prior to estimating the angle of arrival, said compensating comprising synchronizing to within a predetermined range of synchronization the first offset introduced by the first oscillator and the second offset introduced by the second oscillator.

6. The method of claim 5, wherein determining the difference between the first offset and the second offset comprises determining a phase difference between a first phase offset introduced by the first oscillator and a second phase offset introduced by the second oscillator.

7. The method of claim 6, wherein determining the phase difference comprises concurrently coupling the first antenna to a first receiver coupled to the first oscillator and to a second receiver coupled to the second oscillator and deducing the phase difference between the first signal from the first oscillator and the second signal from the second oscillator.

8. The method of claim 1, wherein at least one of the first RF signal and the second RF signal is modulated with respect to at least one of frequency and phase.

9. The method of claim 1, wherein determining the second phase value of the first RF signal and the second phase value of the second RF signal comprises performing calculations using at least one of I and Q values associated with the first RF signal and the second RF signal.

10. An apparatus comprising:
a first receiver to provide a first phase value of a first radio frequency (RF) signal received through a first antenna during a first period and provide a first phase value of a second RF signal received through the first antenna during a second period;

a second receiver configured to provide a second phase value of the first RF signal received through the second antenna during the first period and provide a second phase value of the second RF signal received through a third antenna during a second period;

a direction estimator coupled to the first receiver and the second receiver, the direction estimator configured to estimate an angle of arrival associated with the first RF signal and the second RF signal based on the first and second phase values of the first RF signal and the first and second phase values of the second RF signal; and a regulator coupled to the first receiver, the second receiver, and the direction estimator, the regulator to determine a difference between a first offset introduced by a first oscillator coupled to the first receiver and a second offset introduced by a second oscillator coupled to the second receiver.

11. The apparatus of claim 10, wherein the direction estimator is configured to compensate for the determined difference to estimate the angle of arrival, wherein the direction estimator is configured to estimate the angle of arrival based on a first phase difference and a second phase difference, wherein the first phase difference is between the first phase value and the second phase value of the first RF signal and the second phase difference is between the first phase value and the second phase value of the second RF signal.

12. The apparatus of claim 10, wherein the direction estimator is configured to determine a phase difference between the first phase value of the first RF signal and the first phase value of the second RF signal and subtract the phase difference from the second phase value of the second RF signal to estimate a third phase value of the first RF signal received through the third antenna during the first period, wherein the direction estimator is configured to use the estimated third phase value to estimate the angle of arrival.

13. The apparatus of claim 10, wherein said regulator is configured to concurrently couple the first antenna to the first receiver and the second receiver to determine a phase difference between the first phase offset introduced by the first oscillator and the second phase offset introduced by the second oscillator.

14. The apparatus of claim 10, wherein each RF signal has a frequency within the Industrial, Scientific, and Medical (ISM) band and encodes at least a portion of a Bluetooth packet or a ZigBee packet, and wherein at least one of the first RF signal and the second RF signal is modulated with respect to at least one of frequency and phase.

15. A wireless device comprising:
an antenna array including a first antenna, a second antenna, and a third antenna;

a first receive path coupled to a first oscillator and to the first antenna;

a coupling circuitry configured to alternately couple to the second antenna and the third antenna;

a second receive path coupled to a second oscillator and to the coupling circuitry, the second receive path to provide phase values associated with RF signals received through the second antenna and the third antenna;

a regulator coupled to the first oscillator and the second oscillator and configured to synchronize a first offset introduced by the first oscillator with a second offset introduced by the second oscillator; and processing circuitry configured to estimate a direction of a source of first RF signals and second RF signals relative to the antenna array, based on a first phase difference of the first RF signal between the first antenna and the second antenna, a second phase difference of the second RF signal between the first antenna and the third antenna, and the synchronized first and second offsets.

16. The wireless device of claim 15, wherein the second receive path is coupled to a phase estimator to estimate a phase value of the first RF signal received through the second antenna and a phase value of the second RF signal received through the third antenna, based on at least one of an I signal and a Q signal associated with each of the first RF signal and the second RF signal.

17. The wireless device of claim 15, wherein the first receive path includes a first down-conversion mixer and the second receive path includes a second down-conversion mixer, wherein the wireless device further comprises a regulator coupled to the first receive path and the second receive path, the regulator to regulate one or more local oscillator inputs to the first down-conversion mixer and the second down-conversion mixer to reduce an effect of phase offset on the estimate of the direction.

18. The wireless device of claim 15, wherein the wireless device and a source of the first and second RF signals are connected within a Wireless Personal Area Network.

* * * * *